(12) United States Patent
Maeda

(10) Patent No.: US 6,999,147 B2
(45) Date of Patent: Feb. 14, 2006

(54) REFLECTOR, LIQUID CRYSTAL DISPLAY DEVICE, AND ELECTRONIC APPARATUS

(75) Inventor: Tsuyoshi Maeda, Yamanashi (JP)

(73) Assignee: Seiko Epson Corporation, Tokyo (JP)

( * ) Notice: Subject to any disclaimer, the term of this patent is extended or adjusted under 35 U.S.C. 154(b) by 80 days.

(21) Appl. No.: 10/310,760

(22) Filed: Dec. 6, 2002

(65) Prior Publication Data

US 2003/0128319 A1 Jul. 10, 2003

(30) Foreign Application Priority Data

Dec. 7, 2001 (JP) .............................. 2001-374230

(51) Int. Cl.
*G02F 1/1335* (2006.01)
(52) U.S. Cl. ...................... 349/115; 349/106
(58) Field of Classification Search ........ 349/113–115, 349/109, 106, 108, 105
See application file for complete search history.

(56) References Cited

U.S. PATENT DOCUMENTS

| | | | | |
|---|---|---|---|---|
| 6,100,861 A | * | 8/2000 | Cohen et al. ................. | 345/88 |
| 6,266,113 B1 | * | 7/2001 | Yamazaki et al. ........... | 349/115 |
| 6,671,016 B1 | * | 12/2003 | Kim ............................ | 349/115 |
| 6,693,688 B1 | * | 2/2004 | Hisatake et al. ............ | 349/113 |

FOREIGN PATENT DOCUMENTS

| JP | A 11-153789 | 6/1999 |
|---|---|---|
| JP | A 2000-122059 | 4/2000 |
| JP | A 2000-131684 | 5/2000 |
| JP | A 2000-171789 | 6/2000 |
| JP | A 2000-193968 | 7/2000 |
| JP | 2000-267063 | 9/2000 |
| JP | A 2000-258760 | 9/2000 |
| JP | A 2000-321408 | 11/2000 |
| JP | A 2000-356769 | 12/2000 |
| JP | A 2001-183643 | 7/2001 |
| JP | A 2001-183644 | 7/2001 |
| JP | 2001-209046 A | 8/2001 |
| JP | A 2001-209046 | 8/2001 |
| JP | A 2001-305520 | 10/2001 |
| JP | A 2001-337320 | 12/2001 |
| JP | A 2001-357979 | 12/2001 |
| JP | A 2002-221713 | 8/2002 |
| JP | A 2003-139931 | 5/2003 |

\* cited by examiner

*Primary Examiner*—Robert Kim
*Assistant Examiner*—Thoi V. Duong
(74) *Attorney, Agent, or Firm*—Oliff & Berridge, PLC

(57) ABSTRACT

To provide a reflector using cholesteric liquid crystals arranged in a structure for reducing thickness, and a transflective liquid crystal display device including the reflector.

[Solving Means] In a transflective layer 18, pitch areas 18R, 18G, and 18B are formed within a plane of one dot, and color filters 30R, 30G, and 30B of respective colors are formed in respective dots in order to form one pixel. Therefore, the transflective layer 18 can be formed thin, and can reflect white light by a mixture of the colors of light reflected by the respective pitch areas 18R, 18G, and 18B in one dot. In addition, the pitch areas 18R, 18G, and 18B can pass the complementary colors of the colors corresponding to the pitch areas 18R, 18G, and 18B, so that, even by color mixture, white light can be transmitted in one dot. Therefore, it is possible to perform a color displaying operation for each pixel through a color filter layer 30 based on reflected light and transmitted light close to these white lights.

15 Claims, 5 Drawing Sheets

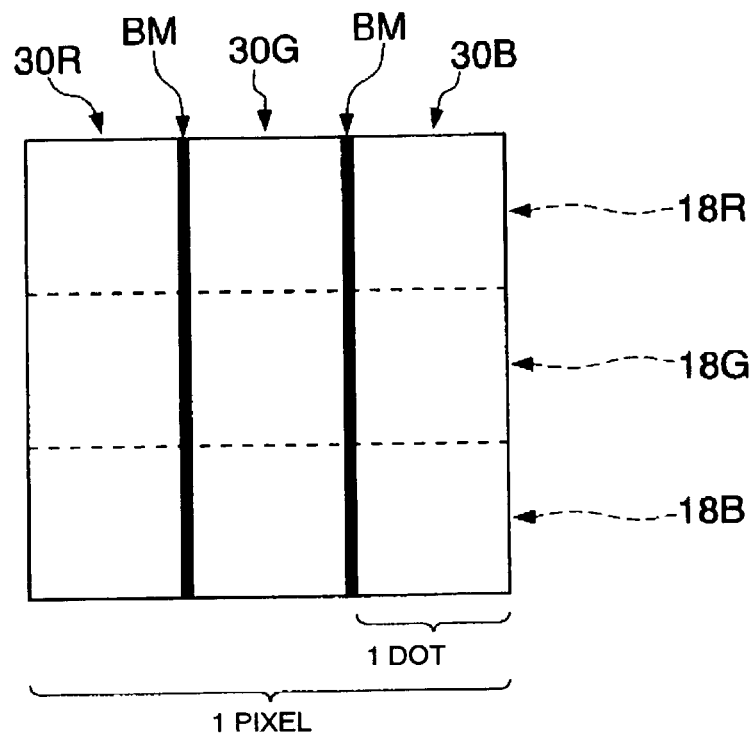
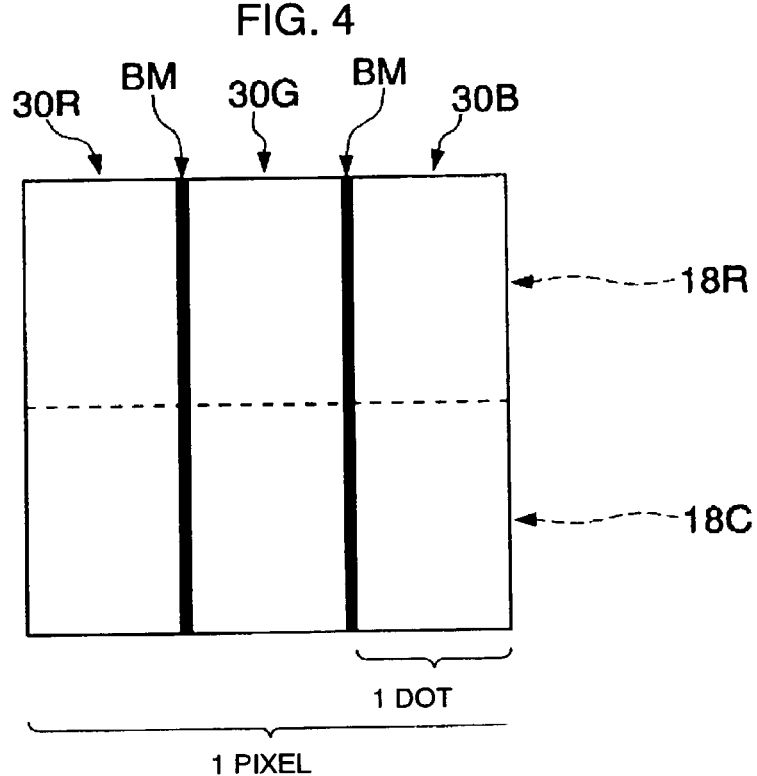

REFLECTOR, LIQUID CRYSTAL DISPLAY DEVICE, AND ELECTRONIC APPARATUS

BACKGROUND OF THE INVENTION

1. Field of Invention

The present invention relates to a reflector, a liquid crystal display device, and an electronic apparatus, and, more particularly, to a reflector comprising a cholesteric liquid crystal layer, a liquid crystal display device including the reflector, and an electronic apparatus including the liquid crystal display device.

2. Description of Related Art

Hitherto, a cholesteric reflector using cholesteric liquid crystals has been proposed. The cholesteric liquid crystals are made up of liquid crystal molecules arranged in a regular helical structure at a certain pitch, and selectively reflect light having a wavelength matching the helical pitch, but passes light having wavelengths other than the wavelength matching the helical pitch. Therefore, the use of a reflector using cholesteric liquid crystals makes it possible to provide a transflective liquid crystal display device which selectively reflects light having a particular wavelength on the one hand, and which passes light having wavelengths other than the particular wavelength on the other.

SUMMARY OF THE INVENTION

In such a reflector using cholesteric liquid crystals, cholesteric liquid crystal layers having different pitches are stacked in order to form a cholesteric reflector which can be used to perform a displaying operation by reflection using light close to white light that is little colored in the visible range. Therefore, the thickness of the cholesteric liquid crystal layers becomes of the order of 10 $\mu$m. When, for example, this reflector is formed on an inner surface of a liquid crystal display device as a transflective display element as described above, it may be difficult to uniformly control the thickness of the liquid crystal layers (of the order of 5 $\mu$m). Accordingly, when the thickness of the liquid crystal layers becomes ununiform, the displaying operation may not be properly performed due to, for example, a reduction in contrast.

The present invention has been carried out to overcome the above-described problems, and has as its object the provision of a reflector using cholesteric liquid crystals arranged in a structure for reducing film thickness, a transflective liquid crystal display device including the reflector, and an electronic apparatus including the liquid crystal display device.

[Means for Solving the Problems]

To this end, according to one aspect of the present invention, there is provided a reflector including a cholesteric liquid crystal layer and being capable of reflecting colored lights having wavelengths corresponding to helical pitches of the cholesteric liquid crystal layer. The cholesteric liquid crystal layer includes within a plane a plurality of pitch areas having liquid crystal molecules arranged at different helical pitches. The plurality of pitch areas reflect the colored lights having wavelengths that differ according to the helical pitches of the pitch areas, respectively.

In this case, since the plurality of pitch areas reflect colored lights having different wavelengths in accordance with the helical pitches of the areas, they reflect the colored lights of three primary colors of light, R light, G light, and B light, in accordance with the helical pitches, respectively, so that they can have structures which pass complementary colors thereof. Therefore, using the present-invention reflector, it is possible to realize a transflective display using light close to white light that is little colored. Since, in the cholesteric liquid crystal layer, the plurality of pitch areas are formed within a plane, it is possible to form the reflector using one cholesteric liquid crystal layer without stacking pitch areas. Therefore, when the present-invention reflector is used, a thin reflector for transflective display can be provided, and suitably used in an electro-optical apparatus which needs to be reduced in size. For example, when the reflector having the above-described structure is used as a transflective display element in the liquid crystal display device, the thickness of the liquid crystal layer serving as an electro-optical element can be made uniform. In the present invention, when, for example, a reflection spectrum is measured for every location of the cholesteric liquid crystal layer in the direction of a plane, the location where the reflection is a minimum, or the location where the rate of change in reflection is discontinuous, can be the boundary between pitch areas.

The cholesteric liquid crystal layer may be one reflecting a portion of circularly polarized light having a predetermined direction of rotation and passing another portion of the circularly polarized light having a predetermined direction of rotation. More specifically, the cholesteric liquid crystal layer reflects colored lights having wavelengths in accordance with the helical pitches thereof, and passes complementary colors thereof, so that the present-invention reflector functions as a transflector.

The plurality of pitch areas may include primary color reflection pitch areas, which can reflect any one of three primary colors of light, for the three primary colors of light, respectively. More specifically, the plurality of pitch areas may include a red-light reflection pitch area which can reflect red light, a green-light reflection pitch area which can reflect green light, and a blue-light reflection pitch area which can reflect blue light. By such a structure, a thin reflector is used to realize a transflective display using light close to white light that is little colored. The helical pitch of the red-light reflection pitch area is approximately 600 to 650 nm. (The wavelength of maximum reflection is close to this wavelength range. This also applies to the description below.) The helical pitch of the green-light reflection pitch area is approximately 550 nm, and the helical pitch of the blue-light reflection pitch area is approximately 400 to 500 nm. Here, when such a reflector is used for color filters of the display device, one pixel is formed from at least three dots, and color filters in which each of the dots is formed from the red-light reflection pitch area, the green-light reflection pitch area, and the blue-light reflection pitch area (which are the primary-color reflection pitch areas) can be realized.

The plurality of pitch areas may include a selected color reflection pitch area which can reflect any selected one of three primary colors of light and a complementary color reflection pitch area which can reflect a complementary color of the selected color. More specifically, the plurality of pitch areas may include a selected color reflection pitch area which can reflect one color selected from red, green, and blue, and a complementary color reflection pitch area which can reflect the complementary color of the selected color. In this case too, a thin reflector is used to realize a transflective display using light close to white light that is little colored. In addition to forming the complementary color reflection pitch area by a cholesteric liquid crystal layer having a helical pitch corresponding to the wavelength of the complementary color, the complementary color reflection pitch area may be formed using stacked cholesteric liquid crystal layers of two different helical pitches corresponding to two of the primary colors that differ from the selected color.

According to another aspect of the present invention, there is provided a liquid crystal display device comprising a liquid crystal cell having a liquid crystal layer (also called a phase modulation liquid crystal layer) interposed between an upper substrate and a lower substrate, which are opposing light-transmissive substrates. The liquid crystal display device further comprises means, disposed at the upper substrate side, for causing circularly polarized light to be incident upon the liquid crystal layer from the upper substrate; means, disposed at the lower substrate side, for causing circularly polarized light having the same direction of rotation as the circularly polarized light from the upper substrate to be incident upon the liquid crystal layer from the lower substrate; and an illuminating device for causing light to be incident upon the liquid crystal cell from the lower substrate. In the liquid crystal display device, in one of a state in which an electrical field is selectively applied and a state in which an electrical field is not selectively applied, the liquid crystal layer reverses the polarity of the circularly polarized light incident upon the liquid crystal layer; and, in the other of the state in which an electrical field is selectively applied and a state in which an electrical field is not selectively applied, the liquid crystal layer does not reverse the polarity of the circularly polarized light incident upon the liquid crystal layer. The liquid crystal display device still further comprises a transflective layer which comprises the reflector having the above-described structure and which is provided on the inner surface of the lower substrate.

According to such display device, external light incident upon the liquid crystal layer as circularly polarized light from the upper substrate due to the means, disposed at the upper substrate side, for causing light to enter as circularly polarized light is modulated into circularly polarized light having either a leftward or rightward rotation by the phase modulation liquid crystal layer. The circularly polarized light having a particular direction of rotation (such as rightward rotation) is reflected by the transflective layer and used for display. On the other hand, illumination light entering from the lower substrate enters as circularly polarized light due to the means, disposed at the lower substrate side, for causing light to enter as circularly polarized light. The circularly polarized light having a particular direction of rotation (for example, leftward rotation, which is different from the direction of rotation of the circularly polarized light that is reflected) passes through the transflective layer and is used for display. In the present invention, since the reflector having the above-described structure is used as the transflective layer, the transflective layer can realize a display using light close to white light that is little colored, and, as mentioned above, the cholesteric liquid crystal layer can be formed thin without stacking cholesteric liquid crystal layers, so that the entire device can be reduced in thickness, and the thickness of the phase modulation liquid crystal layer can be made more uniform compared to, in particular, the case where transflective layers are stacked. In the specification, such a liquid crystal display device which performs a displaying operation by transmission and reflection is sometimes called a "transflective" liquid crystal display device, and, unless otherwise specified, the liquid-crystal-side surface of a substrate is called the inner surface, and the surface of the substrate opposite to the liquid-crystal-side surface is called the outer surface.

The transflective layer may include within a plane a plurality of pitch areas divided with every helical pitch of the liquid crystal molecules in one dot, the plurality of pitch areas being capable of reflecting the colored lights having different wavelengths in accordance with the helical pitches of the pitch areas, respectively. In this case, since, in the transflective layer, the plurality of pitch areas reflect the colored lights having wavelengths that differ according to the helical pitches of the pitch areas, respectively, they are formed so as to reflect the colored lights of three primary colors, R light, G light, and B light, in accordance with the helical pitches, respectively. Therefore, it is possible to realize a transflective display using light much closer to white light. As a more detailed structure, primary color reflection pitch areas, which can reflect any one of the three primary colors of light, may be provided in the one dot for the three primary colors of light, respectively. In this case, in the transflective layer, one pixel is formed from at least three dots, and each of the dots is formed from the red-light reflection pitch area, the green-light reflection pitch area, and the blue-light reflection pitch area (which are the primary color reflection pitch areas).

The three primary color reflection pitch areas may be formed with substantially the same areas. In this case, since, the three primary color reflection pitch areas having equal areas are provided in one dot, it is possible to perform a displaying operation using light much closer to white light for each dot. Since each primary color reflection pitch area passes light other than light of its primary color, the ratio between reflection display and transmission display in each pitch area is approximately 1:2. Since these areas have equal areas, the liquid crystal display device can realize a display with a ratio between reflection display and transmission display of approximately 1:2. In this case, a ratio between reflection display and transmission display of approximately 1:2 means that approximately ⅓ of the light incident upon the transflective layer is reflected and approximately ⅔ thereof is transmitted.

The area of the green-light reflection pitch area can be made the largest of the areas of the primary color reflection pitch areas. In this case, since green has a relatively high reflectance ratio and the highest luminous efficiency, the reflectance ratio in the liquid crystal display device is relatively large. Therefore, it is possible to provide a display device in which display by reflection is important. On the other hand, when the area of the green-light reflection pitch area is the smallest of the areas of the pitch areas, it is possible to provide a display device in which display by transmission is important.

A selected color reflection area which can reflect any selected one of three primary colors of light and a complementary color reflection area which can reflect a complementary color of the selected color may be formed in the one dot. In this case too, the use of the selected color and the complementary color makes it possible to perform a transflective display using light much closer to white light. The selected color reflection area and the complementary color reflection area may be formed with substantially the same areas. In this case, the ratio between reflection display and transmission display in the selected color reflection area is approximately 1:2, while the ratio between reflection display and transmission display in the complementary color reflection area for reflecting colored light other than the light of the selected color is approximately 2:1. When the areas of these areas are equal, the liquid crystal display device can realize a display with a ratio between reflection display and transmission display of approximately 1:1. As mentioned above, in the liquid crystal display device of the present invention, it is possible to arbitrarily set the ratio between transmission display and reflection display based on the areas of the pitch areas of the transflective layer.

The following is an example of a method for forming the plurality of liquid crystal molecules having different helical pitches with each dot, that is, the pitch areas. First, a cholesteric liquid crystal layer is uniformly applied to a surface of a predetermined substrate, and the resulting structure is irradiated with ultraviolet light. Here, when the resulting structure is exposed with an intensity distribution so that the intensity of the ultraviolet light differs in a dot, the helical pitches of the liquid crystal molecules are made different in accordance with this intensity (photoisomerization reaction), so that a cholesteric liquid crystal layer including pitch areas divided for each pitch of the liquid crystal molecules is formed. Alternatively, it is possible to change the helical pitches of the liquid crystal molecules by providing, for example, ultraviolet wavelength distribution or thermal distribution for each dot, instead of providing ultraviolet intensity distribution. Here, the plurality of pitch areas may be formed with rectangular shapes, in which case the exposure efficiency is increased, and the area of each pitch area becomes easier to set, that is, the ratio between transmission display and reflection display becomes easier to set arbitrarily.

On the other hand, a color filter layer comprising a plurality of pigment layers containing pigments of various colors may be formed on the inner surface of the transflective layer. In this case, since light close to white light reflected or transmitted by the transflective layer passes through the color filter layer, the liquid crystal display device can perform a color displaying operation.

According to still another aspect of the present invention, there is provided an electronic apparatus including the liquid crystal display device having the above-described structure. Such an electronic apparatus is thin on the one hand and makes it easy to arbitrarily set the ratio between transmission display and reflection display on the other.

BRIEF DESCRIPTION OF THE DRAWINGS

FIG. 3 is a schematic plan view of a color filter layer and the transflective layer of the liquid crystal display device shown in FIG. 1.

FIG. 4 is a schematic plan view for illustrating a modification of the transflective layer.

DETAILED DESCRIPTION OF PREFERRED EMBODIMENTS

Hereunder, a description of an embodiment of the present invention will be given with reference to the drawings.

Figure 1:
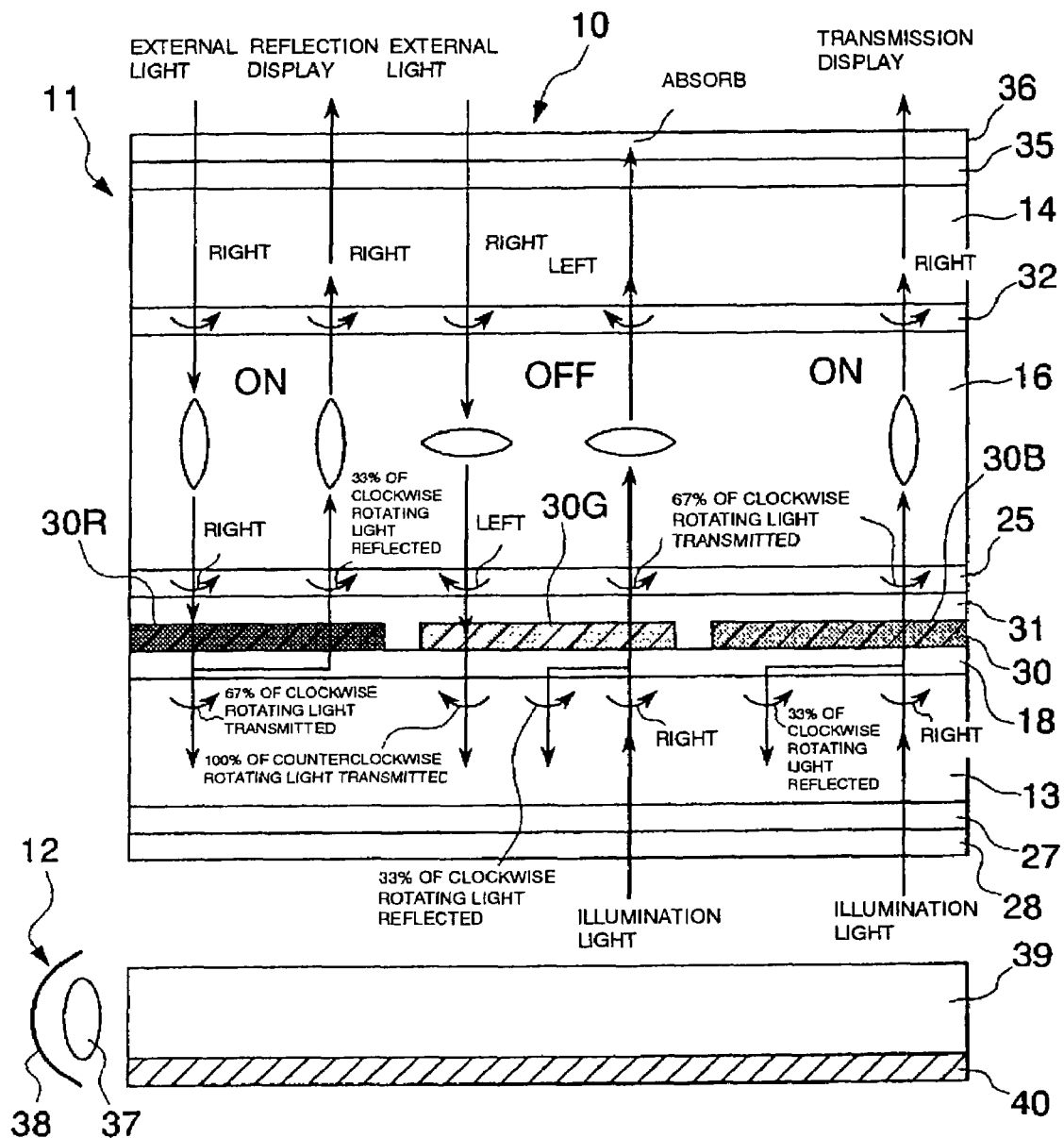
FIG. 1 is a partial sectional schematic view of the structure of a liquid crystal display device of an embodiment of the present invention.

FIG. 1 is a partial sectional structural view of a liquid crystal display device of an embodiment of the present invention, in which a passive matrix transflective color liquid crystal display device is taken as an example. In order to make it easier to see all of the figures, the film thickness, dimensional ratios, etc. of the structural elements are made different as appropriate in all of the figures mentioned below.

As shown in FIG. 1, a liquid crystal display device 10 of the embodiment comprises a liquid crystal cell 11 and a backlight 12 (illuminating device). In the liquid cell 11, a lower substrate 13 and an upper substrate 14 oppose each other through a sealant (not shown), and a space defined by the upper substrate 14, the lower substrate 13, and the sealant is filled with a liquid crystal layer (phase modulation liquid crystal layer) 16 made up of STN (super twisted nematic) liquid crystals. The backlight 12 is disposed at the back side of the liquid crystal cell 11 (outer side of the lower substrate 13).

The lower substrate 13 and the upper substrate 14 are mainly formed of a light-transmissive material such as glass or plastic. A retardation film (¼ wavelength film) 27 and a lower polarizer 28 are provided adjacent the outer surface of the lower substrate 13 (side of the lower substrate 13 opposite to the side where the liquid crystal layer 16 is formed) in that order from the lower substrate 13. Similarly, a retardation film (¼ wavelength film) 35 and an upper polarizer 36 are also formed adjacent the outer surface of the upper substrate 14 (side of the upper substrate 14 opposite to the side where the liquid crystal layer 16 is formed) in that order from the upper substrate 14.

A transflective layer 18 including a cholesteric liquid crystal layer is provided on the inner surface (liquid-crystal-layer-16-side surface) of the lower substrate 13. A color filter layer 30 having a R (red) pigment layer 30R, a G (green) pigment layer 30G, and a B (blue) pigment layer 30B repeatedly formed in the direction of the surfaces of the substrates is provided on top of the transflective layer 18. A planarizing film (overcoat) 31 for planarizing stepped portions formed by the transflective layer 18 or the color filter layer 30 (pigment layers) is stacked on top of the color filter layer 30. A stripe signal electrode 25, formed of a transparent electrically conductive film such as an ITO film, is provided on top of the planarizing film 31 so as to extend in a direction perpendicular to the plane of the sheet of FIG. 1. A stripe scanning electrode 32, formed of a transparent electrically conductive film such as an ITO film, is provided on the inner surface (the liquid-crystal-layer-16-side surface) of the upper substrate 14 so as to extend in the illustrated horizontal direction.

The backlight 12 comprises a light source 37, a reflector 38, and a light guide plate 39. A reflector 40 for causing light passing through the light guide plate 39 to exit towards the liquid crystal cell 11 is provided on the bottom surface of the light guide plate 39 (side of the light guide plate 39 opposite to the side where the liquid crystal cell 11 is provided).

The upper polarizer 36 passes only unidirectional linearly polarized light (illustrated horizontal direction in the embodiment), and the retardation film 35 converts the linearly polarized light transmitted through the upper polarizer 36 into circularly polarized light. Therefore, the upper polarizer 36 and the retardation film 35 function as means, disposed adjacent the upper substrate, for causing circularly polarized light to be incident upon the liquid crystal layer 16. The lower polarizer 28 passes only unidirectional linearly polarized light (illustrated horizontal direction in the embodiment), and the retardation film 27 converts the linearly polarized light transmitted through the lower polarizer 28 into circularly polarized light. Therefore, the lower polarizer 28 and the retardation film 27 function as means, disposed adjacent the lower substrate, for causing circularly polarized light to be incident upon the liquid crystal layer 16.

When a voltage is applied between the scanning electrode 25 and the signal electrode 32 (when an electrical field is selectively applied), the liquid crystal layer 16 is aligned in a direction perpendicular to the plane of the sheet of FIG. 1 (vertical direction), whereas, when a voltage is not applied therebetween (when an electrical field is not selectively applied), the liquid crystal layer 16 is aligned in a transverse direction horizontal with respect to the plane of the sheet of FIG. 1 (horizontal direction). "When an electrical field is not selectively applied" means "when the applied voltage to the liquid crystal layer is less than a threshold voltage of the liquid crystals," whereas "when an electrical field is selectively applied" means "when the applied voltage to the liquid crystal layer is equal to or greater than a threshold voltage of the liquid crystals." In such liquid crystal layer 16, the phase of incident light can be modulated in accordance with the selective application of an electrical field. In other words, in the embodiment, when an electrical field is selectively applied, it is possible to pass incident circularly polarized light as circularly polarized light having the same rotation as the light incident upon the liquid crystal layer 16 without modulating the phase of the incident circularly polarized light. On the other hand, when an electrical field is not selectively applied, it is possible to pass incident circularly polarized light as circularly polarized light obtained by modulating the phase of the incident circularly polarized light and reversing the rotation of the incident circularly polarized light.

Figure 2:
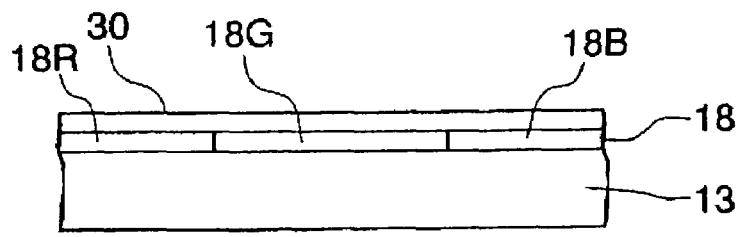
FIG. 2 is an enlarged partial sectional view of a transflective layer of the liquid crystal display device shown in FIG. 1.

The transflective layer 18 including a cholesteric liquid crystal layer is formed so as to pass a predetermined amount of circularly polarized light of a particular rotational direction and reflect the remaining amount thereof. In the embodiment, the transflective layer 18 passes approximately 67% and reflects approximately 33% of clockwise rotating circularly polarized light (ratio between transmission and reflection is approximately 2:1), so that it passes 100% of counterclockwise rotating circularly polarized light. This is based on the fact the cholesteric liquid crystals reflect colored lights having wavelengths in accordance with their helical pitches. As shown in FIG. 2, the cholesteric liquid crystal layer is divided for each helical pitch of the liquid crystal molecules.

FIG. 2 shows the transflective layer 18 from a direction after rotation of the transflective layer 18 shown in FIG. 1 by 90°. The transflective layer 18 comprises a red-light reflection pitch area 18R, a green-light reflection pitch area 18G, and a blue-light reflection pitch area 18B within a plane, and the plurality of pitch areas are formed as a reflector for reflecting colored lights having different wavelengths in accordance with helical pitches of the pitch areas, respectively. More specifically, the red-light reflection pitch area 18R is made up of cholesteric liquid crystals which reflect light maximally when the helical pitch is approximately 600 nm, the green-light reflection pitch area 18G is made up of cholesteric liquid crystals which reflect light maximally when the helical pitch is approximately 550 nm, and the blue-light reflection pitch area 18B is made up of cholesteric liquid crystals which reflect light maximally when the helical pitch is approximately 450 nm, so that colored lights having wavelengths corresponding to the helical pitches are reflected by the respective areas.

FIG. 3 shows the color filter layer 30 and the transflective layer 18 in plan view, with the front side in the plane of the sheet of FIG. 3 representing the color filter layer 30 and the back side in the plane of the sheet of FIG. 3 representing the transflective layer 18. In the color filter layer 30, a black matrix BM is formed at each color boundary. In this way, in the transflective layer 18, the pitch areas 18R, 18G, and 18B are formed within a plane of one dot, so that color filters 30R, 30G, and 30B of the corresponding colors are formed in respective dots in order to provide one pixel. In this case, the transflective layer 18 can reflect light close to white light by a mixture of light reflected by each of the pitch areas 18R, 18G, and 18B in one dot, so that, based on the reflected light, a color display can be realized for every pixel by the color filter layer 30. Each of the pitch areas 18R, 18G, and 18B can transmit colored light, which is light of a complementary color. Even by a mixture thereof, light which is close to white light can be transmitted in one dot, so that, based on the transmitted light, a color display can be realized for every pixel by the color filter layer 30.

Since each of the pitch areas 18R, 18G, and 18B reflects light corresponding to its helical pitch and transmits light of a complementary color, the ratio between transmission and reflection is approximately 2:1. As shown in FIG. 3, since, in the embodiment, the areas of the pitch areas 18R, 18G, and 18B in one dot are substantially equal to each other, the ratio between transmission and reflection of every pixel is approximately 2:1.

In the liquid crystal display device 10 of the embodiment, incident external light passes through the upper polarizer 36 and the retardation film 35 and becomes clockwise rotating circularly polarized light, and the clockwise rotating circularly polarized light is incident upon the liquid crystal layer 16. Here, when a voltage is applied between the scanning electrode 25 and the signal electrode 32 (when an electrical field is selectively applied), the liquid crystal layer 16 is turned on, and the clockwise rotating circularly polarized light passes through the liquid crystal layer 16 unchanged. On the other hand, when a voltage is not applied between the scanning electrode 25 and the signal electrode 32 (when an electrical field is not selectively applied), the liquid crystal layer 16 is in an off state, so that the clockwise rotating circularly polarized light is converted into counterclockwise rotating circularly polarized light, which passes through the liquid crystal layer 16.

A predetermined wavelength of the clockwise rotating circularly polarized light which has exited from the liquid crystal layer 16 is absorbed by the color filter 30. For example, the R (red) pigment layer 30R corresponding to R (red) absorbs a wavelength of a complementary color of R (red), the G (green) pigment layer 30G corresponding to G (green) absorbs a wavelength of a complementary color of G (green), and the B (blue) pigment layer 30B corresponding to B (blue) absorbs a wavelength of a complementary color of B (blue). Therefore, for example, the wavelength of the clockwise rotating circularly polarized light which has passed through the R (red) pigment layer 30R is approximately 600 to 650 nm.

The clockwise rotating circularly polarized light which has passed through the color filter layer 30 and which has become a colored light of a particular wavelength range is incident upon the transflective layer 18. Of the clockwise rotating circularly polarized light incident upon the transflective layer 18, approximately 67% of the light is transmitted, and approximately 33% of the light is reflected. The approximately 33% of the clockwise rotating circularly polarized light that has been reflected passes through the color filter layer 30, the liquid crystal layer 16, the upper substrate 14, the retardation film 35, and the upper polarizer 36 again and is used for display. When an electrical field is not selectively applied to the liquid crystal layer 16, a counterclockwise rotating circularly polarized light is incident upon the transflective layer 18, and is not reflected by the transflective layer 18, so that the light is not used for display in the case of transflective layer 18.

On the other hand, illumination light incident upon the liquid crystal cell 11 from the illuminating device 12 passes through the lower polarizer 28 and the retardation film 27, and becomes clockwise rotating circularly polarized light, which is incident upon the transflective layer 18 from therebelow. Even here, like the external light, approximately 33% of the incident clockwise rotating circularly polarized light is reflected, and approximately 67% of the incident clockwise rotating circularly polarized light is transmitted. In this case, the approximately 67% of the clockwise rotating circularly polarized light that has been transmitted passes through the color filter layer 30, the liquid crystal layer 16, the upper substrate 14, the retardation film 35, and the upper polarizer 36, and is used for display.

As mentioned above, in the liquid crystal display device 10 of the embodiment, the transflective layer 18 includes the pitch areas 18R, 18G, and 18B, divided at each cholesteric liquid crystal layer having helical pitches corresponding to the three primary colors of light, within a plane. Therefore, compared to the case where colors are mixed by stacked pitch areas, the transflective layer 18 can be made thin, so that the liquid crystal display device 10 can be reduced in size, and the thickness of the liquid crystal layer 16 can be made relatively uniform. In the embodiment, the transflective layer 18 has a thickness of approximately 1 to 2 µm.

The transflective layer 18 illustrated in the embodiment can be formed by the following method. For example, cholesteric liquid crystals are uniformly applied to a surface of a predetermined substrate, and the resulting structure is irradiated with ultraviolet light. Here, the resulting structure is exposed with an intensity distribution so that the intensity of the ultraviolet light differs in a dot, and, in accordance with this intensity, the helical pitches of the liquid crystal molecules can be made different for every predetermined area, so that these predetermined areas are formed as the above-described pitch areas. Alternatively, it is possible to change the helical pitches of the liquid crystal molecules for each pitch area by providing, for example, ultraviolet wavelength distribution or thermal distribution in each dot, instead of providing ultraviolet light intensity distribution. As shown in FIG. 3, since each of the pitch areas 18R, 18G, and 18B has a rectangular shape in plan view, the exposure efficiency is increased, and each of the areas can be easily designed in terms of area ratios.

Hereunder, several modifications of the transflective layer 18 are given.

(First Modification)

Like FIG. 3, FIG. 4 is a plan view of the color filter layer 30 and the transflective layer 18, with the front side in the plane of the sheet of FIG. 4 representing the color filter layer 30 and the back side in the plane of the sheet of FIG. 4 representing the transflective layer 18. In the modification, a red-light reflection pitch area (selected color reflection area) 18R which reflects red of the three primary colors of light, and a cyan reflection pitch area (complementary color reflection area) 18C which can reflect cyan which is a complementary color of red are formed in one dot. Even in this case, red (selected color) and cyan (complementary color) make it possible to realize a transflective display using light close to white light.

The ratio between reflection and transmission in the red-light reflection pitch area 18R is approximately 1:2, while the ratio between reflection and transmission for reflecting colored light other than red light in the cyan reflection pitch area 18C is approximately 2:1. In addition, as shown in FIG. 4, the red-light reflection pitch area 18R and the cyan reflection pitch area 18C have substantially the same areas, so that the ratio between reflection and transmission in each pixel is approximately 1:1.

Figure 5:
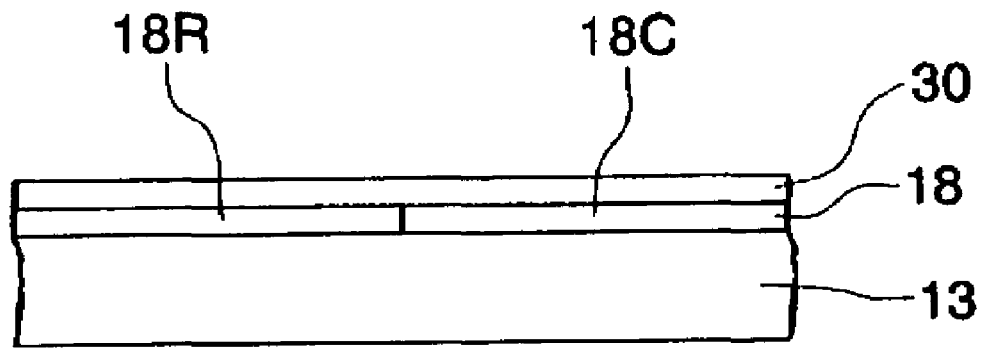
FIG. 5 is an enlarged partial sectional view of the transflective layer shown in FIG. 4.

As shown in FIG. 5, such red-light reflection pitch area 18R and the cyan reflection pitch area 18C can be formed within a plane at the cholesteric liquid crystal layer having wavelength pitches corresponding to the colors.

Figure 6:
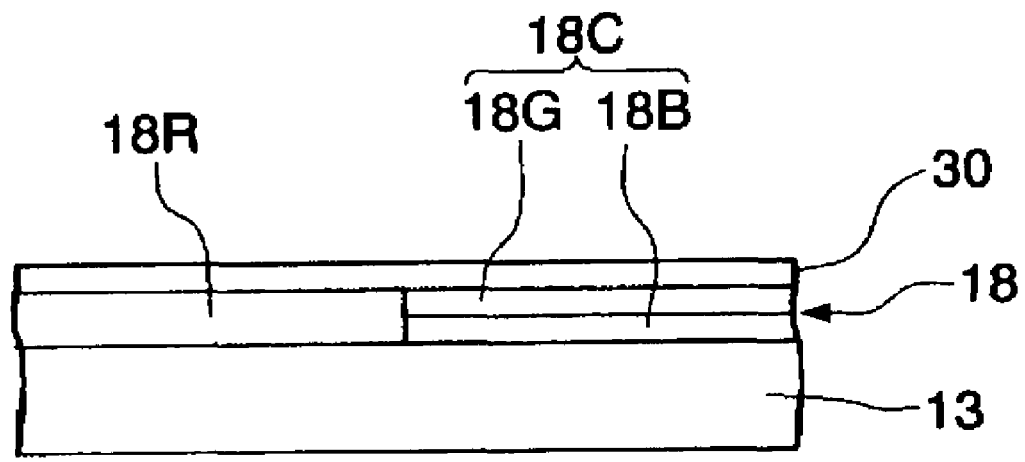
FIG. 6 is an enlarged partial sectional view of a modification of the transflective layer shown in FIG. 5.

As shown in FIG. 6, the cyan reflection pitch area 18C can be formed by stacking the green-light reflection pitch area 18G and the blue-light reflection pitch area 18B corresponding to the green color and the blue color, respectively. In this case, by stacking the green-light reflection pitch area 18G and the blue-light reflection pitch area 18B, the transflective layer 18 is thicker than that shown in FIG. 5. However, compared to the related case where, for example, three layers, desirably, six layers need to be stacked in order to provide white light by stacking color pitch areas of the three primary colors, the transflective layer 18 shown in FIG. 6 can be formed thinner.

Although, in the modification shown in FIG. 4, in one dot, the red-light reflection pitch area 18R, serving as a selected color reflection area, and the cyan reflection pitch area 18C, serving as a complementary color reflection area, are formed in a plane, a combination of the green-light reflection pitch area, serving as a selected color reflection area, and a magenta reflection pitch area, serving as a complementary color reflection area, or a combination of the blue-light reflection pitch area, serving as a selected color reflection area, and a yellow reflection pitch area, serving as a complementary color reflection area, may be used.

(Second Modification)

Figure 7:
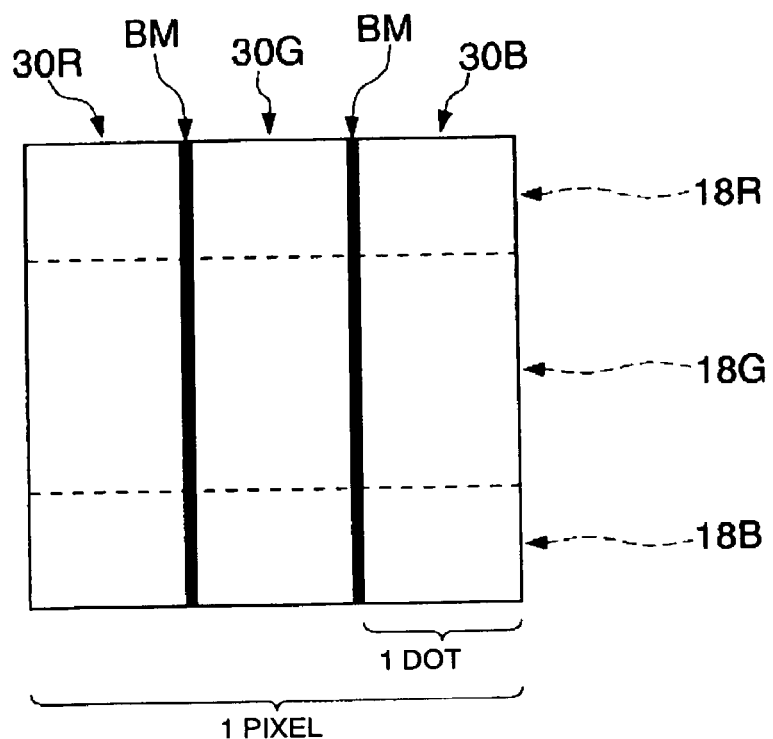
FIG. 7 is a schematic plan view for illustrating a modification of the transflective layer.

Like FIG. 3, FIG. 7 is a plan view of the color filter layer 30 and the transflective layer 18, with the front side in the plane of the sheet of FIG. 7 representing the color filter layer 30 and the back side in the plane of the sheet of FIG. 7 representing the transflective layer 18. In the modification, in one dot, the area of the green-light reflection pitch area 18G corresponding to the green color is the largest of the areas of the pitch areas 18R, 18G, and 18B. In this case, since green has a relatively high reflectance ratio and the highest luminous efficiency, the reflectance ratio in the liquid crystal display device is relatively large. Therefore, it is possible to provide a display device in which display by reflection is important. More specifically, in one dot, the ratio between the areas of the pitch areas 18R, 18G, and 18B is approximately 1:2:1 in that order.

(Third Modification)

Figure 8:
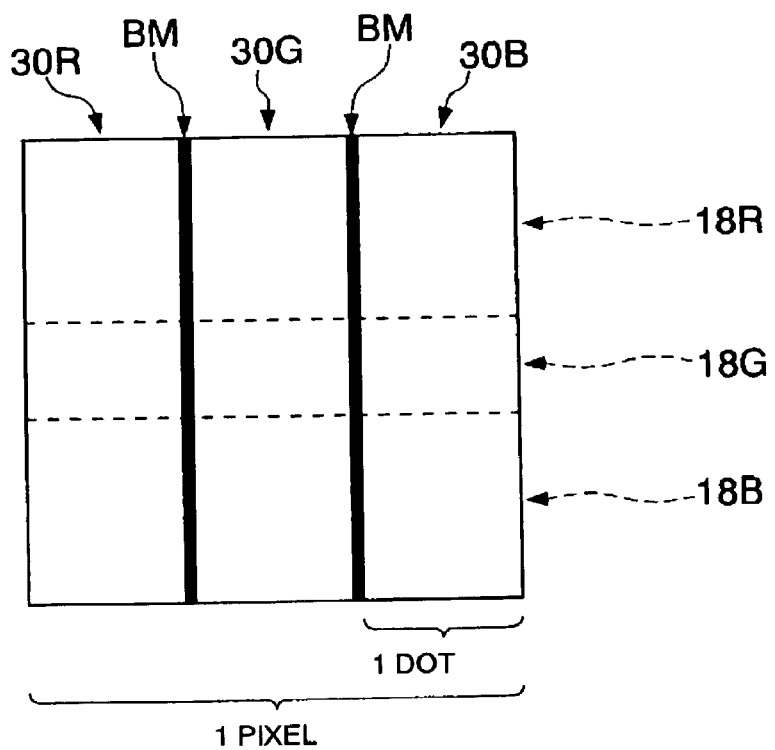
FIG. 8 is a schematic plan view for illustrating a modification of the transflective layer.

Like FIG. 3, FIG. 8 is a plan view of the color filter layer 30 and the transflective layer 18, with the front side in the plane of the sheet of FIG. 8 representing the color filter layer 30 and the back side in the plane of the sheet of FIG. 8 representing the transflective layer 18. In this case, the area of the green-light reflection pitch area 18G is the smallest of the areas of the pitch areas 18R, 18G, and 18B. Therefore, it is possible to provide a display device in which display by transmission is important. In the modification, in one dot, the ratio between the areas of the pitch areas 18R, 18G, and 18B is approximately 2:1:2 in that order.

[Electronic Apparatus]

A description of examples of an electronic apparatus including the liquid crystal display device of the embodiment will be given.

Figure 9:
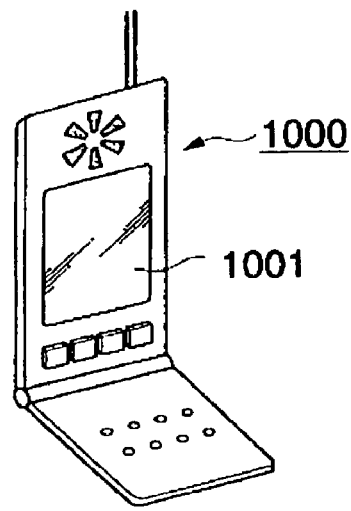
FIG. 9 is a perspective view of an example of an electronic apparatus according to the present invention.

FIG. 9 is a perspective of an example of a cellular phone. In FIG. 9 reference numeral 1000 denotes the body of the cellular phone, and reference numeral 1001 denotes a liquid crystal display section using the liquid crystal display device.

Figure 10:
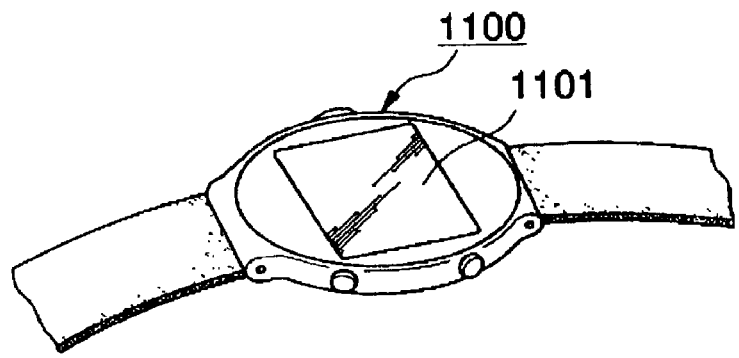
FIG. 10 is a perspective view of another example of an electronic apparatus according to the present invention.

FIG. 10 is a perspective view of an example of a wristwatch electronic apparatus. In FIG. 10, reference numeral 1100 denotes the body of the timepiece, and reference numeral 1101 denotes a liquid crystal display section using the liquid crystal display device.

Figure 11:
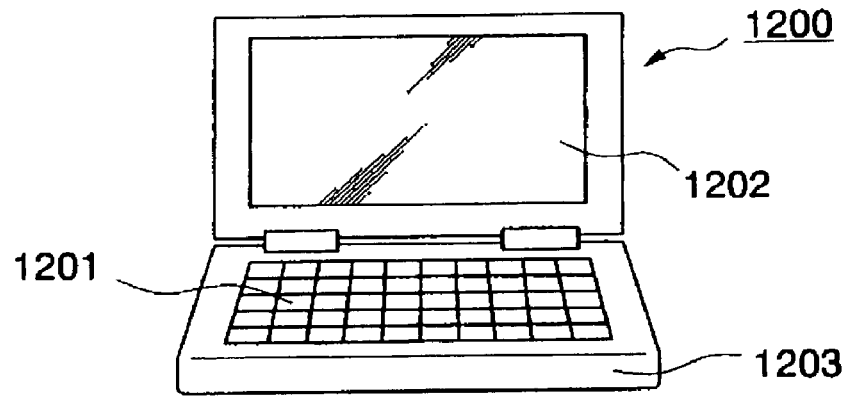
FIG. 11 is a perspective view of still another example of an electronic apparatus according to the present invention.

FIG. 11 is a perspective view of an example of a portable information processor such as a word processor or a personal computer. In FIG. 11, reference numeral 1200 denotes an information processor, reference numeral 1202 denotes an input section such as a keyboard, reference numeral 1204 denotes the body of the information processor, and reference numeral 1206 denotes a liquid crystal display section using the liquid crystal display device.

Since the electronic apparatuses shown in FIGS. 9 to 11 use the liquid crystal display device of the embodiment, the display section is formed thin. In addition, since the liquid crystal layer has a relatively uniform thickness, it is possible to realize an electronic apparatus providing high contrast and having little display failure.

The technical scope of the present invention is not limited to the above-described embodiment, so that various modifications may be made within a scope not departing from the gist of the present invention. For example, in the embodiment, an active matrix monochromatic liquid crystal display device may be used instead of a passive matrix transflective color liquid crystal display device. Although, in the embodiment, the color filter layer is provided at the side of the inner surface of the lower substrate, it may be provided at the side of the inner surface of the upper substrate.

[Advantages]

As described in detail above, according to the present invention, the transflective layer of the liquid crystal display device is formed using a reflector including pitch areas, formed by dividing a cholesteric liquid crystal layer with every helical pitch, within a plane, so that a thin cholesteric transflective layer having a thickness of the order of 1 to 2 μm can be formed, and a liquid crystal display device having a liquid crystal layer of a uniform thickness can be realized. In the liquid crystal display device of the present invention, the display ratio between transmission and reflection can be arbitrarily set based on the areas of the pitch areas of the transflective layer.

What is claimed is:

1. A reflector structure, comprising:
   a cholesteric liquid crystal layer, the cholesteric liquid crystal layer including, within a plane, a plurality of pitch areas having liquid crystal molecules arranged at different helical pitches, the plurality of pitch areas reflecting colored lights having wavelengths that differ according to the helical pitches of the pitch areas, respectively, the plurality of pitch areas including at a first dot:
   a first color reflection pitch area that reflects at least one color of light; and
   a second color reflection pitch area that reflects at least another color of light, the one color and the other color being different colors of light; and
   at a second dot:
   a third color reflection pitch area that reflects at least one or the other color of light,
   a color filter layer including color filter sections for each selectively transmitting a different one of colors, each color filter section defining a dot, and
   wherein the color filter sections of the color filter layer each having a stripe shape as viewed in plan, the color reflection pitch areas each having a stripe shape and each intersecting the color filter sections as viewed in plan.

2. The reflector according to claim 1, the cholesteric liquid crystal layer reflecting a portion of circularly polarized light having a predetermined direction of rotation and passing another portion of the circularly polarized light having a predetermined direction of rotation.

3. The reflector according to claim 1, the plurality of pitch areas including a selected color reflection pitch area which reflects any selected one of three primary colors of light and a complementary color reflection pitch area which reflects a complementary color of the selected color.

4. A liquid crystal display device comprising:
   a liquid crystal cell having a liquid crystal layer interposed between an upper substrate and a lower substrate, which are opposing light-transmissive substrates;
   a first device, disposed at the upper substrate side, that causes circularly polarized light to be incident upon the liquid crystal layer from the upper substrate;
   a second device, disposed at the lower substrate side, that causes circularly polarized light having a same direction of rotation as the circularly polarized light from the upper substrate to be incident upon the liquid crystal layer from the lower substrate; and
   an illuminating device that causes light to be incident upon the liquid crystal cell from the lower substrate;
   wherein, in one of a state in which an electrical field is selectively applied and a state in which an electrical field is not selectively applied, the liquid crystal layer reverses the polarity of the circularly polarized light incident upon the liquid crystal layer, and wherein, in the other of the state in which an electrical field is selectively applied and a state in which an electrical field is not selectively applied, the liquid crystal layer does not reverse the polarity of the circularly polarized light incident upon the liquid crystal layer;
   wherein the liquid crystal display device further comprises:
   a transflective layer which is provided on an inner surface of the lower substrate, which includes a cholesteric liquid crystal layer, and which is capable of reflecting colored lights having wavelengths corresponding to helical pitches of the cholesteric liquid crystal layer, the cholesteric liquid crystal layer including within a plane a plurality of pitch areas having liquid crystal molecules arranged at different helical pitches, the plurality of pitch areas reflecting the colored lights having wavelengths that differ according to the helical pitches of the pitch areas, respectively, the plurality of pitch areas including at a first dot:
   a first color reflection pitch area that reflects at least one color of light; and a second color reflection pitch area that reflects at least another color of light, the one color and the other color being different colors of light; and at a second dot:

a third color reflection pitch area that reflects at least one or the other color of light, a color filter layer including color filter sections for each selectively transmitting a different one of colors, each color filter section defining a dot, and wherein the color filter sections of the color filter layer each having a stripe shape as viewed in plan, the pitch areas of the transflective layer each having a stripe shape and each intersecting the color filter sections as viewed in plan.

5. The liquid crystal display device according to claim 4, the transflective layer including within a plane a plurality of pitch areas divided with every helical pitch of the liquid crystal molecules in one dot, the plurality of pitch areas being capable of reflecting the colored lights having different wavelengths in accordance with the helical pitches of the pitch areas, respectively.

6. The liquid crystal display device according to claim 5, wherein the pitch areas can reflect any one of three primary colors of light, that are provided in a dot for three primary colors of light, the pitch areas of the respective three primary colors of light being formed with substantially the same areas.

7. The liquid crystal display device according to claim 5, wherein the pitch areas can reflect any one of three primary colors of light, that are provided in a dot for three primary colors of light, an area of the pitch area corresponding to green, that is a green-light reflection pitch area, being the largest of the areas of the pitch areas of the three primary colors of light.

8. The liquid crystal display device according to claim 5, wherein the pitch areas can reflect any one of three primary colors of light, that are provided in a dot for three primary colors of light, an area of the pitch area corresponding to green, that is a green-light reflection pitch area, being the smallest of the areas of the pitch areas of the three primary colors of light.

9. The liquid crystal display device according to claim 5, a selected color reflection pitch area which reflects any selected one of three primary colors of light and a complementary color reflection pitch area which reflects a complementary color of the selected color being formed in the one dot.

10. The liquid crystal display device according to claim 9, the selected color reflection pitch area and the complementary color reflection pitch area being formed with substantially the same areas.

11. The liquid crystal display device according to claim 5, the plurality of pitch areas being formed with rectangular shapes.

12. An electronic apparatus, comprising the liquid crystal display device of claim 4.

13. The liquid crystal display device as claimed in claim 4, further comprising the color filter layer including color filter sections for each selectively transmitting a different one of three primary colors.

14. The liquid crystal display device as claimed in claim 13, the color filter layer being disposed in between the lower substrate and the liquid crystal layer.

15. A reflector structure comprising:

a first colored pigment area defining a first dot of a pixel;

a second colored pigment area defining a second dot of the pixel, the second colored pigment area being a different color that the first colored pigment area;

a first color cholesteric pitch area having liquid crystal molecules arranged at a first helical pitch that reflects a first wavelength of light, the first cholesteric pitch area overlapping both the first and second dots as viewed in plan; and a second color cholesteric pitch area having liquid crystal molecules arranged at a second helical pitch that reflects a second wavelength of light, the second wavelength being different from the first wavelength of light, the first and second color cholesteric pitch areas each having a stripe shape as viewed in plan, and the first and second colored pigment areas each having a stripe shape and each overlapping the first and second color cholesteric pitch areas as viewed in plan.

* * * * *